United States Patent
Rose et al.

(10) Patent No.: US 10,724,663 B2
(45) Date of Patent: Jul. 28, 2020

(54) HOSES AND HOSE ADAPTORS

(71) Applicant: EXEL Industries SA, Paris (FR)

(72) Inventors: Michael Rose, Sutton Coldfield (GB);
Robert Boughton, Sutton Coldfield
(GB); Patrick Ballu, Paris (FR)

(73) Assignee: EXEL INDUSTRIES SA, Paris (FR)

( * ) Notice: Subject to any disclaimer, the term of this patent is extended or adjusted under 35 U.S.C. 154(b) by 215 days.

(21) Appl. No.: 15/624,216

(22) Filed: Jun. 15, 2017

(65) Prior Publication Data

US 2017/0363236 A1    Dec. 21, 2017

(30) Foreign Application Priority Data

Jun. 15, 2016 (GB) .................................. 1610378.0

(51) Int. Cl.

| F16L 33/01 | (2006.01) |
|---|---|
| F16L 33/207 | (2006.01) |
| F16L 33/22 | (2006.01) |
| F16L 39/02 | (2006.01) |
| F16L 11/20 | (2006.01) |
| F16L 11/12 | (2006.01) |
| F16L 35/00 | (2006.01) |

(52) U.S. Cl.
CPC ........... *F16L 33/01* (2013.01); *F16L 33/2076* (2013.01); *F16L 33/227* (2013.01); *F16L 11/12* (2013.01); *F16L 11/20* (2013.01); *F16L 35/005* (2013.01); *F16L 39/02* (2013.01); *Y10T 29/49826* (2015.01)

(58) Field of Classification Search
CPC ..... F16L 33/01; F16L 33/2076; F16L 33/227; F16L 11/12; F16L 11/20; F16L 11/04; F16L 39/02; F16L 39/04; F16L 11/00; F16L 33/222; F16L 37/091; F16L 35/00; F16L 35/005
USPC ............................... 285/8, 56, 238, 257, 260
See application file for complete search history.

(56) References Cited

U.S. PATENT DOCUMENTS

| 5,797,633 A * | 8/1998 | Katzer | F16L 33/222 285/243 |
|---|---|---|---|
| 7,270,349 B2 * | 9/2007 | Bamberger | F16L 37/091 285/249 |
| 2015/0308590 A1 | 10/2015 | Liang | |
| 2016/0215919 A1 | 7/2016 | Huang | |

FOREIGN PATENT DOCUMENTS

| GB | 862351 A | 3/1961 |
|---|---|---|
| GB | 2490276 A | 10/2012 |
| GB | 2537138 A | 10/2016 |

(Continued)

OTHER PUBLICATIONS

GB Search Report for corresponding application No. GB1610378.0 dated Dec. 12, 2016.

(Continued)

*Primary Examiner* — Zachary T Dragicevich
*Assistant Examiner* — William S. Choi
(74) *Attorney, Agent, or Firm* — Heslin Rothenberg Farley & Mesiti P.C.; Victor A. Cardona, Esq.

(57) ABSTRACT

A hose end adaptor for holding an inner component to be nested within an outer tube of a hose includes a first support portion for receiving the outer tube and a second support portion on which a component to be nested within the outer tube is mountable.

20 Claims, 5 Drawing Sheets

(56) References Cited

FOREIGN PATENT DOCUMENTS

| | | |
|---|---|---|
| JP | 50-27608 A | 8/1975 |
| TW | 506913 U | 1/2015 |
| WO | 2015073327 A1 | 5/2015 |

OTHER PUBLICATIONS

Extended European Search Report dated Nov. 11, 2017 for corresponding EP application No. 17175840.2-1754, completed on Oct. 30, 2017.

\* cited by examiner

HOSES AND HOSE ADAPTORS

CROSS-REFERENCE TO RELATED APPLICATION

This application claims priority to GB Application No. 1610378.0 filed on Jun. 15, 2016, the entire disclosure of which is incorporated herein by reference.

TECHNICAL FIELD

This invention relates to hoses and hose adaptors.

BACKGROUND

The ideas in this application are generally applicable to hoses of different types including industrial hoses, for example hoses used in spraying applications, as well as watering hoses including domestic, say, garden hoses. One example of hoses to which the idea relates are garden water supplying hoses of the type which have an expanded and increased length state when pressurised due to water flowing therethrough and a contracted state in the absence of such pressure.

Typically, such hoses have an outer fabric based layer which can contract and in effect crumple as the hose contracts in a non-water filled state and some form of internal elastic member for causing the hose to move to a contracted state in the absence of water pressure.

One such existing expandable hose is described in GB2490276A. That hose has an outer tube formed of a non-elastic and flexible material and an inner tube constructed from an elastic material. The outer tube and the inner tube have a first end attached together by a first coupler and the second end attached together by a second coupler. The hose has a shorter length in a non-water flow contracted state and a longer length in an expanded state where water pressure is applied to the interior of the inner elastic tube. The water flow path is through the inner elastic tube whereas the outer tube serves to control and contain expansion of the inner tube in the expanded state. In the contracted state the outer tube is in a crumpled or undulating state, whereas in the expanded state the outer tube is relatively taut and restrains the inner tube against further expansion.

A potential drawback with a hose of the construction described in GB2490276A is that there can be a tendency for hose failure due to one or other of the couplers failing to successfully hold the inner or outer tube after a period of use. A further issue is that the structure of the hose assembly and coupling method used requires the provision of dedicated couplers of a suitable type for joining the tubes together and thus new designs and tooling are required whenever it is desired to use the hose assembly with a different kind of hose end component.

These drawbacks can occur in other situations where hoses are used as well, particularly where there is an outer hose and something to be mounted within it, be that an inner hose or some other component.

It would be desirable to provide hose connectors, hose assemblies and hose arrangements which aim at addressing one or more of these issues or indeed other issues with existing such hoses.

According to a first aspect of the present invention there is provided a hose end adaptor for holding an inner component to be nested within an outer tube of a hose, the adaptor comprising a first support portion for receiving the outer tube, and a second support portion on which a component to be nested within the outer tube is mountable.

In one set of embodiments the first support portion is the same portion as the second support portion, i.e., there is a common support portion acting as both the first and second support portions. In another set of embodiments the second support portion is spaced from the first support portion, such that mounting of the component is independent of mounting of the outer tube.

The adaptor may comprise an insertion portion for introduction in and clamping by a hose connector portion, such as a conventional hose fitting. The insertion portion may comprise the first support portion. In other embodiments, the insertion portion may be separate from/spaced from the support portions.

The first support portion may be such that in use the first support portion of the adaptor and carried outer tube would be introducible together in and clampable by a hose connector portion, such as a conventional hose fitting.

In an alternative the adaptor may comprise a hose connector portion. That is, rather than this being a separate component, for example, the hose connector portion may be moulded as part of the adaptor. In such cases, in use, the inner component would be clamped to the second support portion of the adaptor and then the outer tube fed over the first support portion of the adaptor and simultaneously into the connector portion. Once so inserted the outer tube could be clamped to the first support portion of the adapter.

The inner component may be an inner tube, which may be of elastic material. In other alternatives the inner component may be something other than a tube, for example an elastic cord. In general the inner component may be anything which it is desired to secure within the outer tube. Typically the inner component will run along the interior of the outer tube to a second end of the outer tube. The second support portion may be arranged to receive and support a tube—i.e., an inner tube.

The outer tube may be arranged to carry fluid, in particular a liquid, and thus may be fluid proof or "waterproof". Where there is an inner tube, this may be arranged to carry to carry fluid, in particular a liquid, and thus may be fluid proof or "waterproof". In some cases both tubes may be arranged to carry fluid, in particular liquid.

The adaptor may comprise a fluid communication passage for allowing fluid communication between an interior of an inner tube mounted on the second support portion and the exterior. The fluid communication passage may be dimensioned such as not cause a flow restriction for flow into or out of the interior of the inner tube.

A through bore may be provided through the second support portion. The through bore may have a diameter which is at least as large as an internal diameter, at locations away from the adaptor, of an inner tube mounted on the second support portion. The internal diameter of the through bore may be at least as large as an at rest internal diameter of the inner tube. It will be understood here that the inner tube may be stretched or deformed over the body of the adaptor, and thus its diameter at that location may be larger than an at rest diameter and/or a diameter at other locations.

The adaptor may be arranged to avoid fluid communication between the interior of a carried inner tube and the annulus between the inner tube and the outer tube. This may, for example, help stop fluid carried by the inner tube from leaking out of the hose.

In an alternative the adaptor may be arranged to allow fluid communication between the interior of a carried inner tube and the annulus between the inner tube and the outer tube. This can allow mixing of fluids carried by the inner and outer tubes in the region of the adaptor. The adaptor may comprise a fluid communication passage for allowing fluid communication between the interior of a carried inner tube and the annulus between the inner tube and the outer tube.

The outer tube may be of a non-elastic material. Alternatively the outer tube may have elasticity to some degree in one or more direction provided that it acts to retain the inner tube. The outer tube may be termed an outer retaining tube. For example, the outer tube may be elastic in the longitudinal direction and non-elastic in the radial or circumferential direction. In another case the outer tube may be elastic but less elastic than the inner tube.

Similarly in other cases neither tube may be elastic. This may be appropriate if say, each tube is provided for carrying a respective liquid.

According to a second aspect of the present invention there is provided a hose end adaptor arrangement comprising a hose end adaptor as defined above and a clamping member for clamping the inner component to the adaptor.

The clamping member may comprise a collar or ferrule.

The clamping member may be deformable into position to clamp an inner component onto the second support portion of the adaptor. In such a case the clamping member will typically be of metal and typically swaged, crimped, pressed or otherwise deformed into position.

Alternatively the clamping member may be threadingly enageable with the adaptor to clamp an inner component onto the second support portion of the adaptor. This can be advantageous since it facilitates demounting of an inner component from the adaptor which may, for example, allow replacement or interchanging of the inner component. The clamping member may comprise a threaded nut.

The clamping member may have a supporting surface with a profile selected to support the inner component in the region of the adaptor. The clamping member may have a flared, for example cone shaped or trumpet shaped, supporting surface. The clamping member may comprise a bore with a flared portion, with a first part of the bore arranged for clamping contact with a clamped inner component and a flared part of the bore arranged for supporting a clamped inner component.

Where the inner component comprises an inner tube, the supporting surface may be arranged to support the wall of the tube in the region of the adaptor. This may relieve stress on the tube and/or the clamping of the tube. In turn this may help to guard against failure. This can be particularly helpful where a flexible and/or elastic inner tube is provided.

The clamping portion may extend beyond the adaptor longitudinally so as to project further within an outer tube in which the adaptor is mounted. This can allow support of the inner component inwards of the adaptor.

According to a third aspect of the present invention there is provided a hose assembly comprising a hose end adaptor as defined above located in an end of a length of outer tube and optionally to which is mounted an inner component nested within the outer tube.

The hose assembly may comprise a clamping member, as defined above, for clamping the inner component to the adaptor.

A support sleeve may be provided in the region of the clamping member so as to be disposed (directly or indirectly) between the clamping member and the inner tube. The support sleeve may be disposed between the inner and outer tubes. The support sleeve may be elastomeric.

The hose assembly may comprise an expansion retainer for controlling expansion of the inner tube. The expansion retainer may comprise a support surface for supporting the inner component. The support surface may be flared. The expansion retainer may comprise a flared bore. The support surface may bound the flared bore. The expansion retainer may extend beyond the adaptor longitudinally so as to project further along an outer tube provided on the adaptor than does the adaptor. The expansion retainer may be provided outside of the outer tube.

The hose assembly may comprise a locking nut for engagement with a connector portion.

The expansion retainer may be retained by, but separate from, the nut. Alternatively, the nut may comprise the expansion retainer.

The clamping member may comprise the expansion retainer.

The hose assembly may comprise a second adaptor provided at a second end of the length of outer tube.

A respective second clamping member may be provided for clamping the inner component to the second adaptor.

Again the second adaptor may comprise a first support portion on which the outer tube is received and a second support portion, spaced from the first support portion, on which second support portion the inner component is mounted such that the mounting of the inner component is independent of the mounting of the outer tube.

The second adaptor may be the same as the first adaptor or vary in at least some respects. Thus the optional features above and below may apply to one or both of the adaptors.

The second support portion may project longitudinally from the first support portion so that the second support portion extends further within the outer tube than the first support portion.

This leads to the clamping position of the inner tube being longitudinally inwards of the clamping position of the outer tube which in turn can help reduce strain on the outer tube in the region at which it is clamped—the outer tube may adopt a more gradual expanding profile from the clamp to its full diameter. Again this can reduce the chance of failure of the hose assembly.

The or each adaptor may be generally tubular. The or each adaptor may have stepped outer surface.

The first support portion of the or each adaptor may have a larger external diameter than that of the second support portion.

The first support portion of the or each adaptor may be provided with at least one retaining rib for helping retain the outer tube.

The second support portion of the or each adaptor may be provided with at least one retaining rib for helping retain the inner component.

The or each adaptor may comprise a rim portion provided on the insertion portion.

The or each adaptor may comprise a rim portion which projects longitudinally beyond the first support portion and beyond the end of the outer tube when mounted on the first support portion. The rim portion may act as open end of the hose assembly which may be introduced into a respective connector portion.

The provision of the rim portion can help protect the end of the outer tube as the hose assembly is introduced into a respective connector and help ensure that the outer tube remains on the adaptor during assembly. In particular the outer tube may be just relatively loosely push fitted or otherwise loosely mounted on the adaptor before insertion of the hose assembly into the respective connector portion, with the connector portion providing the desired clamping of the outer tube when assembled. This can aid the manufacturing and assembly process.

The second support portion may project from the first support portion in a longitudinal direction opposite of that in which the rim portion projects.

The rim portion may also project transversely beyond the first support portion and may also project transversely so as to be flush with or project beyond the outer tube where mounted on the first support portion. The rim portion may have a larger external diameter than the first support portion and may have an external diameter that is the same as or larger than that of the outer tube when mounted on the first support portion.

This can further aid the protective role of the rim portion.

The rim portion may serve to splay apart gripping fingers of a connector portion during insertion of the hose assembly into the connector portion.

The rim portion may be profiled to aid insertion and/or a splaying effect.

The rim portion may have an internal chamfer. This may aid insertion. The rim portion may have an external chamfer. This may aid insertion and/or splaying.

The adaptor may define a receiving bore for receiving a spigot of a respective connector portion.

The receiving bore may be provided in the insertion portion.

The receiving bore may be provided in the first support portion and the connector portion may be arranged to clamp the outer tube and adaptor to the spigot when received in the receiving bore to effect connection between the hose assembly and the connector portion.

A seal may be provided between the spigot and the adaptor.

An o-ring may be provided in the receiving bore to seal between the spigot and the adaptor. Alternatively other sealing means may be provided. The adaptor may be of two materials, a first harder material to facilitate clamping of the inner component to the second support portion and a second softer material to facilitate sealing between the spigot and the adaptor. The first support portion of the adaptor may be of the second softer material. Alternatively, portions of the second softer material may be provided on the internal wall of the adaptor in the receiving bore. The adaptor may be a two shot injection moulded component.

In one embodiment the minimum internal diameter of a fluid flow bore through the adaptor may be bigger than the minimum internal diameter of a fluid flow bore through the spigot.

In another embodiment the minimum internal diameter of a fluid flow bore through the adaptor may be the same or smaller than the minimum internal diameter of a fluid flow bore through the spigot.

This allows a decision to be made as to whether the adaptor or spigot causes a flow restriction or whether a flow restriction is avoided.

The adaptor may be dimensioned and arranged so that when in position at an end of the hose assembly, that end of the hose assembly may be introduced into a standard hose connector portion, for example, a standard garden hose connector portion.

Thus the internal diameter of the receiving bore, the external diameter of the insertion portion/first support portion and/or the material of the insertion portion/first support portion may be selected to correspond with what is expected of a predetermined size of standard hose.

According to a fourth aspect of the present invention there is provided a hose arrangement comprising a hose assembly as defined above, and a first hose end component comprising a first connector portion mounted on a first end of the hose assembly.

The hose arrangement may comprise a second hose end component comprising a second connector portion mounted on a second end of the hose assembly.

The first and/or second connector portion may comprise a spigot which is received in a receiving bore provided in the adaptor when the connector portion is assembled on the hose assembly, and a clamping arrangement comprising a plurality of deformable fingers which surround the spigot and are arranged to be driven into contact with the adaptor or with the exterior of the outer tube carried on the adaptor under action of a locking nut such that the adaptor and where present the outer tube are clamped between the fingers and the spigot.

The first and/or second connector portion may comprise a spigot for introduction into the interior of a hose portion to be held by the connector portion and a clamping arrangement comprising a plurality of deformable fingers which surround the spigot and are arranged to be driven into contact with the exterior of a hose portion to held by the connector under action of a locking nut such that the hose portion is clamped between the fingers and the spigot.

The first and/or second connector portion may comprise a standard hose connector portion, for example a standard garden hose connector portion.

The first and/or second connector portion may comprise a standard hose connector portion of the type comprising a spigot for introduction into the interior of a hose portion to be held by the connector portion and a clamping arrangement comprising a plurality of deformable fingers which surround the spigot and are arranged to be driven into contact with the exterior of a hose portion to held by the connector under action of a locking nut such that the hose portion is clamped between the fingers and the spigot.

As will be clear the above defined adaptors, hose assemblies and hose arrangements can be used in many different circumstances—for example industrial situations, such as for example spraying applications, as well as domestic situations. The carried fluid may be a liquid, in some cases this will be water, but it might also be another liquid. One particular application is a water supplying (say watering) hose, for example, a garden water supplying hose.

According to another aspect of the present invention, there is provided a method of making a hose assembly as defined above comprising the steps of:

providing an inner component within a length of outer tube so as to be nested therein;

clamping a first end of the inner component to the second support portion of a first hose end adaptor;

clamping a second end of the inner component to the second support portion of a second hose end adaptor;

locating a first end of the outer tube on the first support portion of the first hose end adaptor; and locating a second end of the outer tube on the first support portion of the second hose end adaptor.

According to yet another aspect of the present invention, there is provided a method of making a hose arrangement as defined above comprising the steps of:

i) making a hose assembly by the steps of:

providing an inner component within a length of outer tube so as to be nested therein;

clamping a first end of the inner component to the second support portion of a first hose end adaptor;

clamping a second end of the inner component to the second support portion of a second hose end adaptor;

locating a first end of the outer tube on the first support portion of the first hose end adaptor;

locating a second end of the outer tube on the first support portion of the second hose end adaptor; and ii) locating and clamping a first end of the hose assembly in a connector portion of a first hose end component; and locating and clamping a second end of the hose assembly in a connector portion of a second hose end component.

According to a further aspect of the present invention there is provided a garden water supplying hose arrangement comprising a hose assembly, a first hose end component comprising a first connector portion mounted on a first end of the hose assembly and a second hose end component comprising a second connector portion mounted on a second end of the hose assembly, the hose assembly comprising an outer tube of flexible material and an inner tube of an elastic material for carrying water through the hose assembly, wherein due to the action of the elastic inner tube, the hose assembly has a shorter length in a contracted state in the absence of water pressure in the interior of the inner elastic tube and a longer length in an expanded state when water pressure is applied to the interior of the elastic inner tube, and the outer tube has an undulating state when the hose assembly is in the contracted state and serves to control and contain expansion of the inner tube when the hose assembly is in the expanded state, and wherein the hose assembly comprises a first adaptor provided at a first end of the hose assembly for allowing connection of the first end of the hose assembly to the first connector portion, the first adaptor comprising a first support portion on which the outer tube is mounted and the first support portion of the adaptor and the outer tube being accepted together in and clamped by the first connector portion when the hose arrangement is assembled, and the first adaptor comprising a second support portion, spaced from the first support portion, on which second support portion the elastic inner tube is mounted such that the mounting of the elastic inner tube is independent of the mounting of the outer tube.

This arrangement leads to more secure mounting of the elastic tube and more secure mounting of the outer tube than if a common mounting is used to help protect against failure of connection of either tube from the first connector portion.

According to a further aspect of the present invention there is provided a garden water supplying hose assembly for use in a garden water supplying hose arrangement of the type having a first hose end component comprising a first connector portion mounted on a first end of a hose assembly and a second hose end component comprising a second connector portion mounted on a second end of a hose assembly, the hose assembly comprising an outer tube of flexible material and an inner tube of an elastic material for carrying water through the hose assembly, wherein, in use as part of a hose arrangement, due to the action of the elastic inner tube, the hose assembly has a shorter length in a contracted state in the absence of water pressure in the interior of the inner elastic tube and a longer length in an expanded state when water pressure is applied to the interior of the elastic inner tube, and the outer tube has an undulating state when the hose assembly is in the contracted state and serves to control and contain expansion of the inner tube when the hose assembly is in the expanded state, and wherein the hose assembly comprises a first adaptor provided at a first end of the hose assembly for allowing connection of the first end of the hose assembly to a first connector portion of a first hose end component, the first adaptor comprising a first support portion on which the outer tube is mounted and the first support portion of the adaptor and the outer tube being arranged to be accepted together in a first connector portion of a first hose end component, and the first adaptor comprising a second support portion, spaced from the first support portion, on which second support portion the elastic inner tube is mounted such that the mounting of the elastic inner tube is independent of the mounting of the outer tube.

The outer tube may be of a non-elastic material. Alternatively the outer tube may have elasticity to some degree in one or more direction provided that it acts to retain the inner tube. The outer tube may be termed an outer retaining tube. For example, the outer tube may be elastic in the longitudinal direction and non-elastic in the radial or circumferential direction. In another case the outer tube may be elastic but less elastic than the inner tube.

The hose assembly may comprise a second adaptor provided at a second end of the hose assembly for allowing connection of the second end of the hose assembly to the second connector portion, the second adaptor comprising a first support portion on which the outer tube is mounted and the first support portion of the second adaptor and the outer tube being accepted together in and clamped by the second connector portion when the hose arrangement is assembled, and the second adaptor comprising a second support portion, spaced from the first support portion, on which second support portion the elastic inner tube is mounted such that the mounting of the elastic inner tube is independent of the mounting of the outer tube.

The second adaptor may be the same as the first adaptor or vary in at least some respects. Thus the optional features below may apply to one or both of the adaptors.

The second support portion may project longitudinally from the first support portion so that the second support portion extends further within the outer tube than the first support portion.

This leads to the clamping position of the inner tube being longitudinally inwards of the clamping position of the outer tube which in turn can help reduce strain on the outer tube in the region at which it is clamped—the outer tube may adopt a more gradual expanding profile from the clamp to its full diameter. Again this can reduce the chance of failure of the hose assembly.

The inner elastic tube may be clamped to the or each adaptor via a collar or ferrule. This will typically be of metal and typically swaged, crimped, pressed or otherwise deformed into position so as to clamp the inner elastic tube onto the second support portion of the adaptor.

The or each adaptor may be generally tubular. The or each adaptor may have stepped outer surface.

The first support portion of the or each adaptor may have a larger external diameter than that of the second support portion.

The first support portion of the or each adaptor may be provided with at least one retaining rib for helping retain the outer tube.

The second support portion of the or each adaptor may be provided with at least one retaining rib for helping retain the inner tube.

The or each adaptor may comprise a rim portion which projects longitudinally beyond the first support portion and beyond the end of the outer tube when mounted on the first support portion. The rim portion may act as open end of the hose assembly which may be introduced into the respective connector portion.

The provision of the rim portion can help protect the end of the outer tube as the hose assembly is introduced into the respective connector and help ensure that the outer tube remains on the adaptor during assembly. In particular the outer tube may be just relatively loosely push fitted or otherwise loosely mounted on the adaptor before insertion of the hose assembly into the respective connector portion, with the connector portion providing the desired clamping of the outer tube when assembled. This can aid the manufacturing and assembly process.

The second support portion may project from the first support portion in a longitudinal direction opposite of that in which the rim portion projects.

The rim portion may also project transversely beyond the first support portion and may also project transversely so as to be flush with or project beyond the outer tube where mounted on the first support portion. The rim portion may have a larger external diameter than the first support portion and may have an external diameter that is the same as or larger than that of the outer tube when mounted on the first support portion.

This can further aid the protective role of the rim portion.

The rim portion may serve to splay apart gripping fingers of the connector portion during insertion of the hose assembly into the connector portion.

The rim portion may be profiled to aid insertion and/or a splaying effect.

The rim portion may have an internal chamfer. This may aid insertion. The rim portion may have an external chamfer. This may aid insertion and/or splaying.

The adaptor may define a receiving bore for receiving a spigot of the respective connector portion.

The receiving bore may be provided in the first support portion and the connector portion may be arranged to clamp the outer tube and adaptor to the spigot when received in the receiving bore to effect connection between the hose assembly and the connector portion.

A seal may be provided between the spigot and the adaptor.

An o-ring may be provided in the receiving bore to seal between the spigot and the adaptor. Alternatively other sealing means may be provided. The adaptor may be of two materials, a first harder material to facilitate clamping of the inner tube to the second support portion and a second softer material to facilitate sealing between the spigot and the adaptor. The first support portion of the adaptor may be of the second softer material. Alternatively, portions of the second softer material may be provided on the internal wall of the adaptor in the receiving bore. The adaptor may be a two shot injection moulded component.

The adaptor may be dimensioned and arranged so that when in position at an end of the hose assembly, that end of the hose assembly may be introduced into a standard garden hose connector portion.

Thus the internal diameter of the receiving bore, the external diameter of the first support portion and/or the material of the first support portion may be selected to correspond with what is expected of a predetermined size of standard garden hose.

The hose assembly may be arranged, for example, to be accepted in standard fittings for a predetermined size of standard plastics material garden hose.

The hose assembly may be arranged, for example, to be accepted in fittings for 12.5 mm, 15 mm, or 19 mm standard plastics material garden hose.

The first and/or second connector portion may comprise a spigot which is received in a receiving bore provided in the first support portion of the adaptor when the connector portion is assembled on the hose assembly, and a clamping arrangement comprising a plurality of deformable fingers which surround the spigot and are arranged to be driven into contact with the exterior of the outer tube carried on the adaptor under action of a locking nut such that the outer tube and adaptor are clamped between the fingers and the spigot.

The first and/or second connector portion may comprise a spigot for introduction into the interior of a hose portion to be held by the connector portion and a clamping arrangement comprising a plurality of deformable fingers which surround the spigot and are arranged to be driven into contact with the exterior of a hose portion to held by the connector under action of a locking nut such that the hose portion is clamped between the fingers and the spigot.

The first and/or second connector portion may comprise a standard garden hose connector portion.

The first and/or second connector portion may comprise a standard garden hose connector portion of the type comprising a spigot for introduction into the interior of a hose portion to be held by the connector portion and a clamping arrangement comprising a plurality of deformable fingers which surround the spigot and are arranged to be driven into contact with the exterior of a hose portion to held by the connector under action of a locking nut such that the hose portion is clamped between the fingers and the spigot.

The first hose end component may, for example, comprise one of: a nozzle; a spray gun; a sprinkler; a watering lance; a tap (faucet) connector; a hose fitting—for allowing connection of the hose arrangement to another water source or outlet device; or so on.

The second hose end component may, for example, comprise one of: a nozzle; a spray gun; a sprinkler; a watering lance; a tap (faucet) connector; a hose fitting—for allowing connection of the hose arrangement to another water source or outlet device; or so on.

In each case the respective hose end component may comprise a standard hose connector portion.

As such each hose end component may be a standard hose end component.

In a preferred embodiment each hose end component comprises a hose fitting, say a female hose fitting, which may be a standard hose fitting. For example each hose end component may comprise a female push fit fitting.

A constriction may be provided in at least one of the connector portions, at least one of the hose end components or a component attached thereto for helping ensure the presence of adequate water pressure inside the inner tube during use to cause expansion.

Each of the optional features following each of the aspects of the invention above is equally applicable as an optional feature is respect of each of the other aspects of the invention and could be written after each aspect with any necessary changes in wording. The optional features are not written after each aspect merely in the interests of brevity.

BRIEF DESCRIPTION OF THE DRAWINGS

Embodiments of the present invention will now be described, by way of example only, with reference to the accompanying drawings in which.

DETAILED DESCRIPTION

Figure 1:
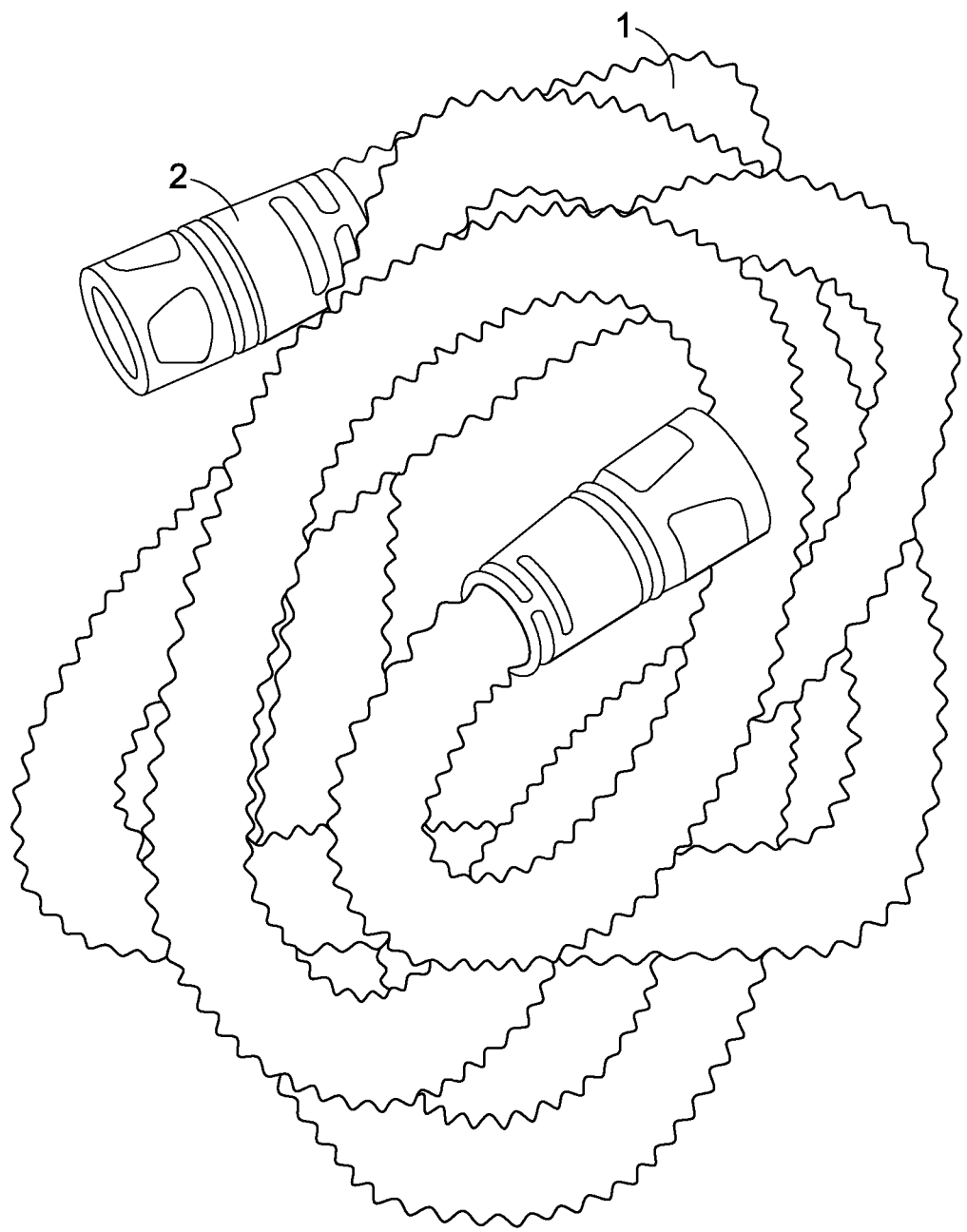
FIG. 1 schematically shows a garden water supplying hose arrangement in a contracted state.
Figure 2:
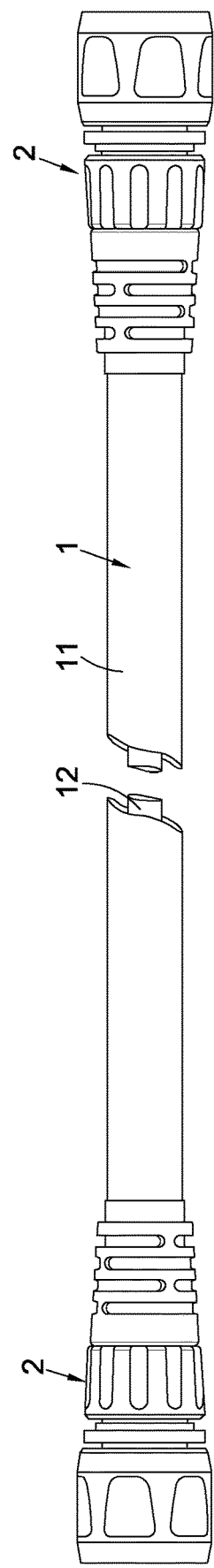
FIG. 2 schematically shows the hose arrangement of FIG. 1 in an extended state.

FIGS. 1 and 2 schematically show a hose arrangement comprising a hose assembly 1 provided at each end with a respective hose end component 2. The hose arrangement is a garden watering hose arrangement for use in, for example, domestic gardens watering plants and/or washing surfaces. FIG. 1 shows the hose arrangement in a contracted state which will tend to be adopted when there is no water within the hose assembly 1. On the other hand, FIG. 2 shows the hose arrangement of FIG. 1 in an extended state which will tend to be adopted when water flows through the hose assembly 1.

Whilst the present description is directed to this particular type of garden watering hose, it is noted again that the ideas of the present invention are more generally applicable than this. They may be used, for example, in other types of watering hoses in non-domestic situations and moreover in other applications, for example industrial applications including say spraying. Such hoses, for example, may not be retractable and/or may have an inner component other than an inner tube—for example an inner elastic cord.

Figure 3:
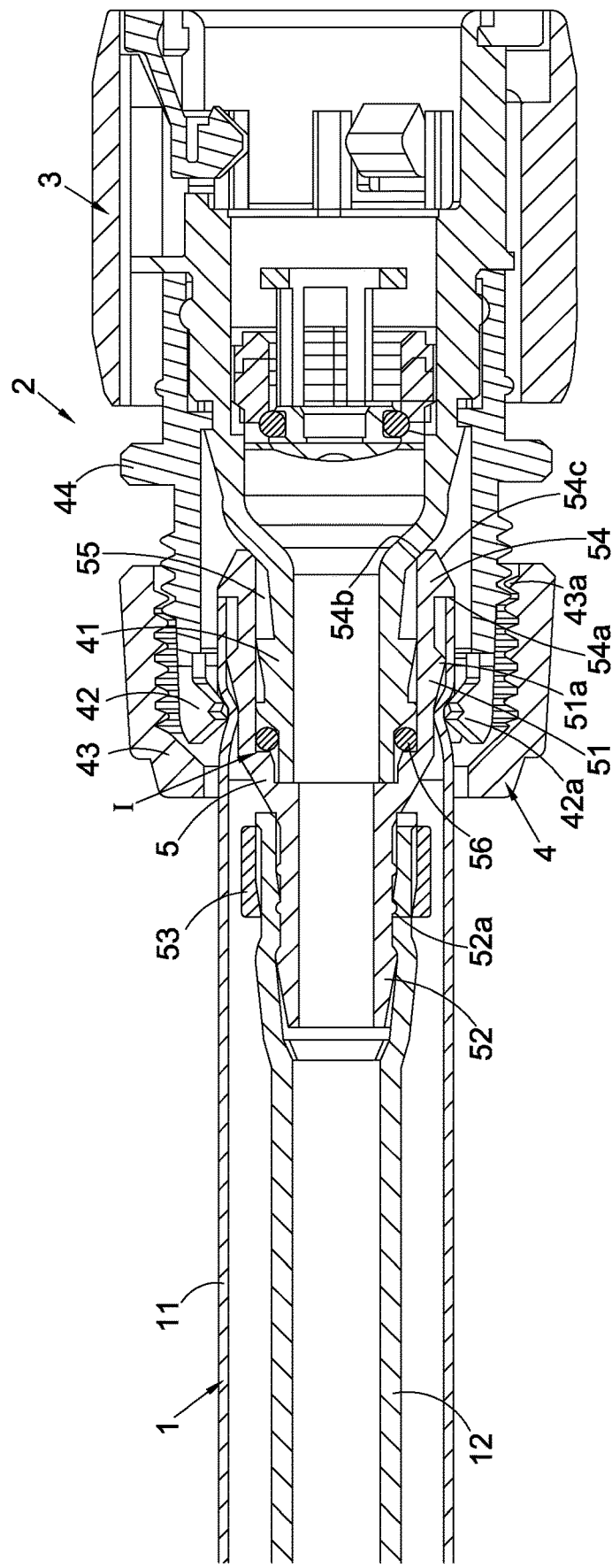
FIG. 3 is a section through a first hose end component of the hose arrangement shown in FIGS. 1 and 2 mounted on the end of a hose assembly of the hose arrangement shown in FIGS. 1 and 2.

FIG. 3 shows one of the hose end components 2 and one end of the hose assembly 1 in more detail. In the present embodiment the other hose end component 2 is identical. In alternatives, however, there may be some differences between the respective hose end components 2. Indeed in some cases a completely different type of hose end component may be provided at one end of the assembly—say like that described in GB2490276A.

In the present embodiment each hose end component 2 is in the form of a hose fitting which is arranged to allow the hose arrangement to be connected to other components. In particular, for example, one of the hose fittings 2 may be connected to a tap or other source of water and the other hose fitting 2 may be connected to a spray gun, nozzle, or other outlet device.

In the present embodiment each hose fitting 2 is an industry standard female push fit hose fitting which is arranged to allow connection to a complimentary male fitting provided on another component.

As shown in FIG. 3, the hose fitting 2 comprises a fitting portion 3 and a connector portion 4. The fitting portion 3 is arranged for connecting to the complimentary male fitting portion provided on another component. Since this part of the fitting 2 is a standard piece of garden watering equipment and is not of particular pertinence to the present invention, further description of it is omitted.

Further note that in other cases, different forms of hose end component may be used in the hose arrangement. Thus, for example, in fact the type of hose fitting 2 shown in FIG. 3 is of a slightly different type than that shown in FIGS. 1 and 2. Furthermore, the hose end component 2 might be a nozzle, spray gun, watering lance, or some other component. Provided that this hose end component 2 has a connector portion 4 of the type described in more detail below, the hose end component 2 may be connected to the hose assembly 1 and used to form a whole hose arrangement.

To put this another way, the hose assembly 1 of the present invention, as will be explained in more detail below, is suitable for use with many different hose end components 2. In general terms, if the hose end component 2 is designed to allow the connection of a standard piece of garden hose to the hose end component 2 it should be useable with the present hose assembly 1. In particular, the present hose assembly 1 should be useable with any hose end component 2 having a connector portion 4 of the general type described below.

The connector portion 4 comprises a spigot 41 which is arranged to be received in the internal bore of a piece of hosepipe to be connected to the connector portion 4. Further, the connector portion 4 comprises a plurality of deformable gripping fingers 42. A locking nut 43 is provided to drive the deformable fingers 42 into the outer surface of a piece of hose received on the spigot 41 as the locking nut 43 is tightened onto the main body 44 of the connector portion 4. In this embodiment the deformable fingers 42 are provided with teeth 42a for biting into the outer surface of the hose and, as will be appreciated, the locking nut 43 and main body 44 of the connector 4 have interengaging threads 43a for allowing tightening of the nut 43 onto the main body 44.

The hose assembly 1 is arranged to be received in the connector portion 4 and is shown so received in FIG. 3. Similarly of course, the hose assembly 1 is arranged to be received in any similar hose connector portion, in particular one comprising a spigot, a plurality of gripping fingers and for use with a locking nut.

The hose assembly 1 comprises a first outer tube 11 of non-elastic and flexible material, for example a woven plastics material, and a second inner, elastic, tube 12 which is for carrying water through the hose assembly 1 and hence whole hose arrangement.

Note that in alternatives the outer tube may be of a material with elasticity to some degree in one or more direction provided that it acts to retain the inner tube. The outer tube may be termed an outer retaining tube. For example, the outer tube may be elastic in the longitudinal direction and non-elastic in the radial or circumferential direction. In another case the outer tube may be elastic but less elastic than the inner tube.

Each end of the hose assembly 1 is provided with a respective adaptor 5. Of course, only one of these adaptors 5 may be seen in FIG. 3.

The adaptor 5 is generally tubular with a through bore through which water may flow between the interior of the inner tube 12 and an internal bore of the fitting portion 3 or more generally an internal bore of the hose end component 2 which comprises the connector portion 4. Thus this through bore forms part of the water flow path through the hose assembly 1 and whole hose arrangement.

The outer tube 11 and inner tube 12 are both mounted on the adaptor 5. However, the tubes 11, 12 are mounted at different and spaced locations on the adaptor 5. The outer tube 11 is mounted on the adaptor 5 at a first support portion 51 and the inner tube 12 is mounted on the adaptor 5 at a second support portion 52. The first support portion 51 is provided with a projecting rib 51a for helping to retain the outer tube 11 on the adaptor 5. Similarly, the second support portion 52 is provided with a plurality of retaining ribs 52a for helping retain the inner elastic tube 12 on the adaptor 5. The inner elastic tube 12 is clamped onto the adaptor 5 at the second support portion 52 via a metal ferrule 53. The ferrule 53 is pressed onto the adaptor 5 over the inner tube 12 to tightly clamp the inner tube 12 to the adaptor 5.

In general terms the adaptor 5 comprises an insertion portion I which is arranged to be received in and clamped by the connector portion 4 of a standard hose end component. In the present embodiment, the insertion portion I comprises the first support portion 51. In other embodiments the first and second support portions 51, 52 may be separate from/spaced from the insertion portion I.

A rim portion 54 is provided at an end of the adaptor 5. This rim portion 54 projects longitudinally and transversely away from the first support portion 51 and serves to protect the end of the outer tube 11.

During manufacture of the hose arrangement in the present embodiment, the hose assembly 1 is first produced by fitting respective adaptors 5 at each end of the inner and outer tubes 11, 12. First, the inner tube 12 is clamped onto the adaptor 5 by the metal ferrule 53. Then the outer tube 11 is loosely mounted on the adaptor 5, in particular on the first support portion 51, by being a push fit over the retaining rib 51a and with the end of the outer tube 11 abutting against the rim portion 54. Note that once assembled with an adaptor 5 at each end, due to the retracting effect of the inner elastic tube 12, the outer tube 11 will tend to be pushed onto each adaptor 5. The rim portion 54 has a shoulder 54a against which the end of the outer tube 11 abuts in this state.

The hose assembly 1 may then be separately introduced into the respective connector portions 4 to complete the assembly of the hose arrangement. This assembly step may be taken separately, both in time and place, from the production of the hose assembly 1.

Further, this approach facilitates the production of hose assemblies 1 as one process for use in producing hose arrangements of different types having different hose end components without the need for dedicated tooling for each type of hose arrangement.

The rim portion 54 has an internal chamfer 54b and an external chamfer 54c for assisting in assembling the hose assembly 1 onto the connector portion 4. In particular, the inner chamfer 54b can help location of the hose assembly 1 onto the spigot 41 as can the outer chamfer 54c. The outer chamfer 54c can also help to drive apart the deformable fingers 42 should these be in an inwardly deformed position at the time when the hose assembly 1 is introduced into the connector portion 44.

When the hose assembly 1 is introduced into the connector portion 4 as shown in FIG. 3, the spigot 41 of the connector portion 4 is received in a receiving bore 55 of the adaptor 5. This receiving bore 55 is within the first support portion 51. The rim portion 54 surrounds an open end of the receiving bore 55 and in this embodiment is a continuous annular portion. The internal chamfer 54b faces the axis of the bore 55 and the external chamfer 54c faces way therefrom.

As the locking nut 43 is tightened onto the main body 44 of the connector portion 4, the deformable fingers 42 deform inwardly driving the outer tube 11 and adaptor 5 (in particular the first support portion 51) toward the spigot 41. This firmly secures the outer tube 11 to the adaptor 5 and the connector portion 4. Thus, at this stage, the outer tube 11 and inner tube 12 are firmly connected to the connector portion 4.

In the present embodiment, an o-ring seal 56 is provided in the receiving bore 55 of the adaptor 5 for helping seal between the spigot 41 and the adaptor 5. This o-ring 56 may be provided as part of the hose assembly 1 if required.

In alternatives, other sealing means may be provided. In particular, the material of the adaptor 5 in the region of the receiving bore 55 may be pliable enough to provide the required seal against the spigot 41. Thus, for example, the adaptor 5 might be made of two different materials. A first harder material in the region of the first support portion 52 to facilitate clamping of the inner hose 12 onto the adaptor 5 and a second softer material in the region of the first support portion 51. Alternatively, the softer material may be provided as part of the adapter 5 at at least some portions in the receiving bore 55 to provide a seal. Thus, for example, a projecting ring of softer material may be provided on the surface of the adaptor 5 that defines the receiving bore 55 to surround and seal to an inserted spigot 41. In either such case, the adaptor 5 might be a two shot injection moulded component moulded using a first harder plastics material and a second softer plastics material. These alternatives may be preferable than the provision of an o-ring since they remove the risk of the o-ring being lost if the hose assembly 1 is disconnected from the connector portion 4.

In some embodiments the hose arrangement may comprise at least one mid-line connection which serves to connect the outer tube 11 to the inner tube 12 at a location part-way along the length of the hose assembly 1. There might be say two such mid-line connections.

As will be appreciated, when the hose arrangement is used water will pass through the inner elastic tube 11. If water is fed into the hose arrangement and the outlet of the arrangement is shut off, for example by a closed valve in a spray gun attached to the hose assembly, the inner tube 11 will expand longitudinally and transversely whilst the thickness of its side walls will tend to decrease. This will lead to a longer hose. Expansion is then contained by the outer tube 12 when its full natural diameter and length are reached. A similar effect is obtained during water flow where there is a constriction at the outlet of the hose arrangement, in say the hose end component or something connected thereto. When the applied pressure is removed, and the hose is not shut off, it will tend to expel carried water and contract.

Figure 4:
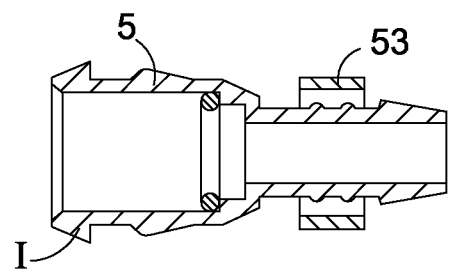
FIG. 4 is a schematic cross-section showing the adaptor and clamping collar of the arrangement of FIG. 3 in isolation.

FIG. 4 shows the adaptor 5 and the clamping collar or ferrule 53 in isolation and before the ferrule 53 is deformed into position to grip the inner tube 12.

It will be noted that in the present arrangement the adaptor 5 forms a barrier between the interior of the inner tube 12 and the interior of the outer tube 11—that is, the annulus that exists between the inner tube 12 and outer tube 11 when the arrangement is assembled. In the present embodiment this is useful as the hose arrangement is arranged so that water is to be carried by the inner tube 12 and the outer tube 11 is not necessarily waterproof.

However, as alluded to above, in a different situation, a different type of hose arrangement may be used. In such a situation, for example, the hose arrangement may be arranged so that fluid can flow both within the inner tube 12 and within the outer tube 11—specifically in the annulus between the inner tube 12 and the outer tube 11. In such a case, both the inner tube 12 and outer tube 11 may be fluid proof (in particular say liquid proof, or waterproof).

In some such situations neither of the tubes 11, 12 may be particularly elastic and the matter of interest may be the fact that there are two tubes nested one within the other which are able to carry different fluids. In such a circumstance, the adaptor 5 may be still constructed as described above if there is no desire to access the fluid in the annulus between the inner tube 12 and outer tube 11. Alternatively, the adaptor 5 may be differently constructed so as to allow the fluids to flow independently through the adaptor 5 and onwards—that is to say the adaptor may be arranged to keep the fluids separate whilst allowing both to flow out of the hose. Alternatively, the adaptor 5 may be arranged to allow mixing of the fluids in the region of the adapter 5. In order to achieve this one or more fluid communication passages may be provided through the material of the adaptor 5 such that fluid in the inner tube 12 may be mixed with fluid in the annulus between the two tubes 11, 12 in the region of the adaptor 5. It will be appreciated that such a construction will more likely be useful in an industrial application where differing fluids are caused to flow through the inner tube 12 on the one hand and the annulus between the outer tube and inner tube 11, 12 on the other hand.

Figure 5:
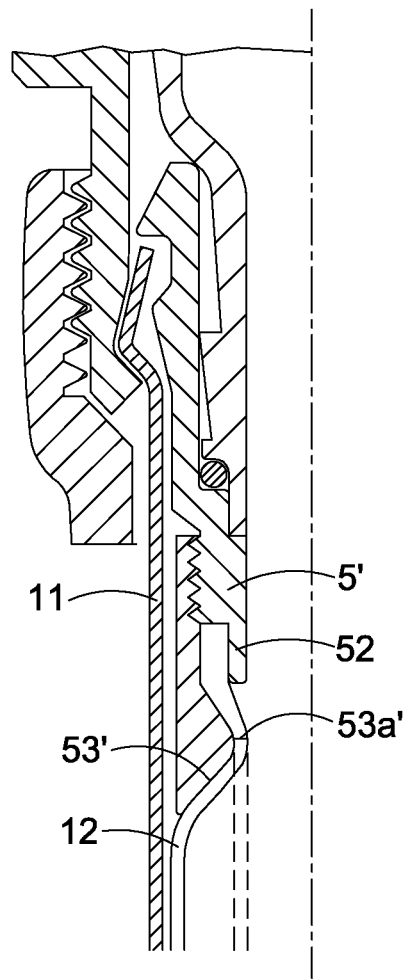
FIG. 5 is a schematic cross-section showing part of an alternative adaptor and clamping collar.

FIG. 5 schematically shows an alternative adaptor 5' and clamping collar 53' which may be used in an arrangement such as that shown and described in relation to FIGS. 1 to 3 or indeed in an alternative arrangement for example when the inner and outer tubes 11 and 12 have a different nature and function as discussed immediately above.

In the alternative shown in FIG. 5, the clamping collar 53' is in the form of a nut which is threadingly engageable with the adaptor 5'. In this alternative the inner tube 12 is still mounted on a second support portion 52 but it is held in place by virtue of the threaded nut 53 being tightened onto the adaptor 5'. In this embodiment the remainder of the adaptor 5', in particular the first support portion 51, the rim portion 54 and receiving bore 55 are substantially the same as those of the adaptor 5 shown in and described in relation to FIGS. 1 to 4. The threaded nut 53' has an internal bore which is profiled so as to support the inner tube 12. In particular, the profile of the inner bore of the nut 53' is arranged to relieve stress on the clamping of the inner tube 12. The threaded nut 53' thus has a support surface 53a' which supports the inner tube 12. This support surface has a flared portion at the distal end of the nut 53' against which the inner tube 12 rests. This is in a region where the diameter of the inner tube 12 expands from a diameter at which it is clamped to an expanded diameter which it adopts when it contains fluid under pressure. Thus, it will be seen that this supporting feature of the threaded nut 53' is particularly relevant where the inner tube 12 is flexible and/or elastic as is the case, for example, in the embodiment described in relation to FIGS. 1-3.

In the present example, the cross section of the sidewall of the nut 53' bulges inwards from the location at which the inner tube 12 is held against the second support portion of the adaptor 5'. Thus, the support portion 53a' projects inwards before flaring outwards towards the distal end of the nut 53'. Thus the inner tube 12 follows a convoluted path between where it is clamped against the second support portion 52 of the adaptor 5' and where it leaves the distal end of the nut 53'. This can help guard against failure of the clamping of the inner tube 12.

Where the clamping member used for securing the inner component is threadingly engaged on the adaptor 5 as, for example, in the embodiment shown in FIG. 5, this leads to advantages as the inner component, for example the inner tube 12, can be demountably mounted on the adaptor 5. This means, for example, that the inner component may be replaced or interchanged in desired.

Note that in another alternative, rather than the adaptor being a separate component this may be part of the connector, or more generally part of the hose end component. Thus rather than a spigot fitting in an internal bore of the adapter and being sealed. These portions may be moulded together as one piece. Thus you would end up with a hose end component which is adapted to mount onto two nested components—that is, an inner component within an outer tube.

Note that in further alternatives the inner component may be something other than a tube. It might for example be a length of solid elastic, wire or similar. Typically it will be an elongate member running through the length of the outer tube.

Figure 6:
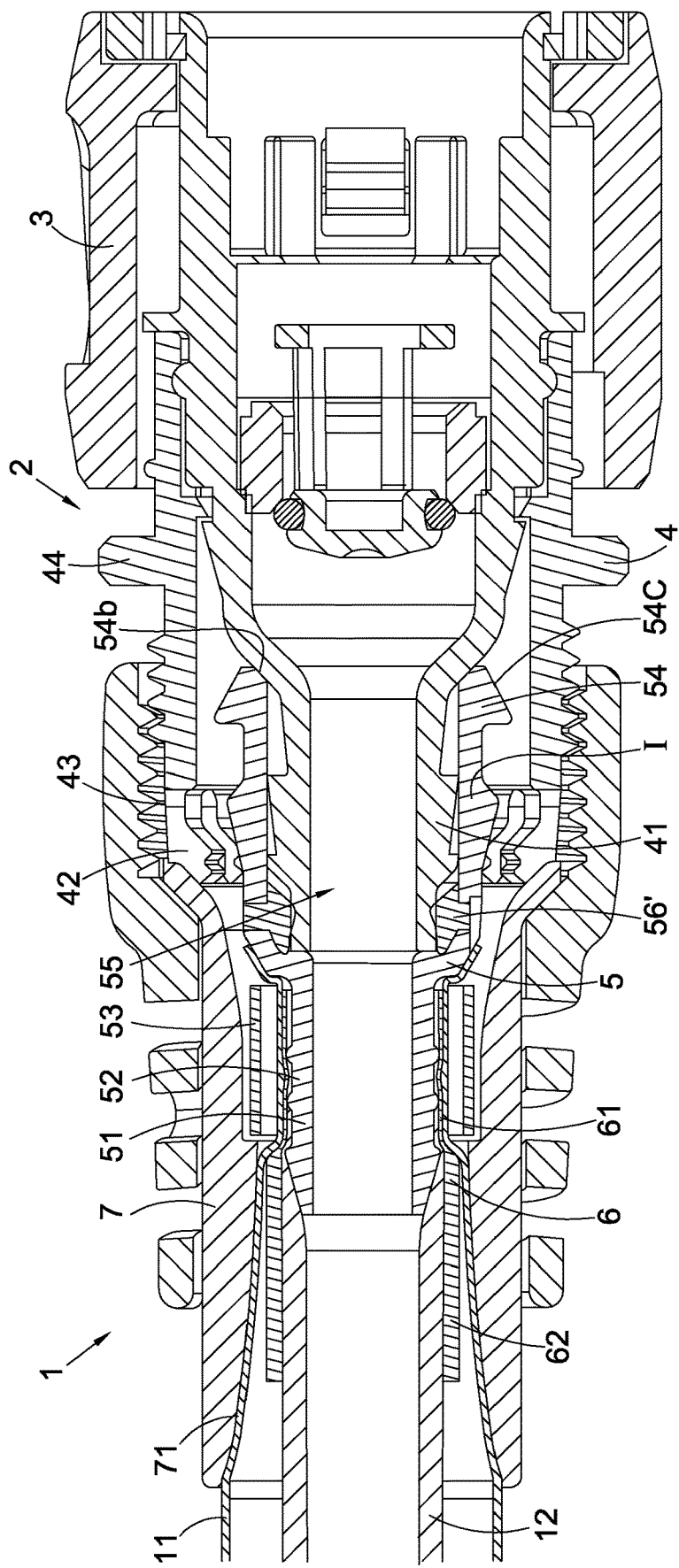
FIG. 6 is a schematic cross-section showing a first hose end component and one end of a hose assembly of an alternative hose arrangement.

FIG. 6 shows part of an alternative hose arrangement which has similarity to that shown in and described reference to FIGS. 1 to 4 but has some differences in the way that the outer tube 11 and inner tube 12 are mounted on the adaptor 5. Detailed description of the alternative shown in FIG. 6 is omitted where the components and operation are the same as that shown in the embodiment described above in relation to FIGS. 1 to 4 and the same reference numerals are used for the parts which are common between these two embodiments.

FIG. 6 shows one end of a hose assembly 1 mounted on a hose fitting 2 to form a garden water supplying hose arrangement. Again a similar fitting 2 may be provided at the other end of the hose assembly 1.

As in the embodiments above the outer tube 11 and inner tube 12 are mounted to the adaptor 5 and the insertion portion I of the adaptor 5 is received in the connector portion 4 of the hose fitting 2 and secured there by the clamping mechanism of the connector portion 4.

However, in this instance both the inner tube 12 and outer tube 11 are clamped to the adaptor 5 by the metal ferrule 53. (Note that the metal ferrule 53 adopts a crenellated or castellated form when deformed into its clamping position, as shown in FIG. 6, and the section shown in FIG. 6 is taken through one of these crenellations such that one can see a section through a top of one the crenellations and then a side wall of the crenellation descending down into contact with the clamped tubes 11, 12.)

Thus in the present embodiment the first and second support portions 51, 52 are located at substantially the same place such that there is in effect a common support portion 51, 52 on the adaptor 5 at which both the tubes 11, 12 are clamped.

Thus in this embodiment the insertion portion I of the adaptor 5 is clamped directly by the deformable fingers 42 of the connector portion 4. That is to say, in contrast to the embodiment shown in FIG. 3 the outer tube 11 does not run over the insertion portion I in the present embodiment and so is not trapped by the fingers 42 in this embodiment. However, in this embodiment, the insertion portion I is still arranged to have most of the features described above where it also constitutes the first support portion. Thus for example the rim portion 54 is still present and provided at the end of the insertion portion I and the rim portion 54 still comprises the respective chamfers 54b, 54c.

Note that in this embodiment rather than an o-ring seal 56 being provided within the receiving bore 55 a softer material portion 56' is moulded with the main body of the adaptor 5 to provide the desired seal to the spigot 41.

In the present embodiment two additional components are provided to help ensure good performance of the hose assembly 1 and in particular the connection of the inner tube 12 and outer tube 11 to the adaptor 5.

First a sleeve of elastomeric material 6 is provided around the inner tube 12 in the region where the tube 12 is clamped. In particular this elastomeric tube is captured by the ferrule 13 and clamped between the inner tube 12 and outer tube 11 at that region. Furthermore the elastomeric sleeve 6 runs for a selected distance around the outside of the inner tube 12 axially inwardly of the clamped region. Thus the elastomeric sleeve 6 has a clamped region 61 and an extension region 62.

The provision of the elastomeric sleeve 6 can help protect the inner tube 12 against failure due to stresses put on the inner tube 12 by the clamping of the ferrule 53 as well as stresses put on the inner tube 12 when the inner tube is subjected to water pressure in use and therefore expands.

In this embodiment the hose assembly 1 also comprises an expansion retainer 7 which is provided to control expansion of the outer tube 11 and hence inner tube 12 in the region where these are clamped to the adaptor 5. Thus similarly to the embodiment shown in FIG. 5 the expansion retainer 7 comprises a support surface 71 for supporting the inner tube 12 against expansion in the region of the ferrule 53.

The supporting surface 71 of the expansion retainer 7 is flared outwards to allow a gradual increase in diameter of the inner tube 12 when subjected to pressure. The support surface 71 defines a flared bore in the retainer 7.

In the present embodiment rather than the expansion retainer 7 being directly mounted to the adaptor 5 it is captured by the locking nut 43 and as such is indirectly mounted to the adaptor 5. Further it will be noted that this expansion retainer 7 also serves to support the inner tube 12 against expansion even though the outer tube 11 lies between the inner tube 12 and the expansion retainer 7.

In the present embodiment as mentioned above the expansion retainer 7 is retained by the locking nut 43. In alternatives the expansion retainer could be formed as part of the locking nut 43. An advantage of it being a separate component yet captured is that this allows the use of a standard locking nut 43 into which the expansion retainer 7 may be located for capture.

During assembly the locking nut 43 and expansion retainer 7 will first be located onto the inner and outer tubes 11, 12 after which the inner and outer tubes 11, 12 are clamped onto the adaptor 5. At this stage the locking nut 43 and expansion retainer 7 are captured as part of the hose assembly 1. As will be appreciated the resulting hose assembly 1 can then be mounted on to a standard connector portion 4 of for example a fitting 2 as shown in FIG. 6.

Whilst in the present embodiment the elastomeric sleeve 6 is shown between the outer tube 11 and inner tube 12 more generally a protective sleeve may be provided in the region of the clamp for clamping along with the inner tube 12. Thus for example the protective sleeve may be provided outside of the outer tube 11 as well as outside of the inner tube 12. The aim is to protect against damage to the inner tube 12 during clamping and also to protect it during expansion which can help prevent hard and/or sharp parts of the ferrule 43 instigating rupture of the inner tube 12.

The invention claimed is:

1. A hose assembly comprising:
   a hose end adaptor arrangement located in an end of a length of outer tube,
   wherein the hose end adaptor arrangement comprises;
   an adaptor which holds an inner component of the hose assembly which is nested within the outer tube of a hose assembly, and which comprises:
   a first support portion on which the outer tube is received, and
   a second support portion on which the inner component is mounted, and
   a clamping member clamping the inner component to the adaptor,
   and wherein the adaptor:
   comprises an insertion portion for introduction in and clamping by a hose connector portion, and
   is dimensioned and arranged so that an end of the hose assembly which comprises said end of the length of outer tube in which the hose end adaptor arrangement is located is introducible into a hose connector portion;
   and wherein the inner component is an inner tube and the hose assembly further comprises an expansion retainer for supporting the inner tube against expansion in the region where the inner tube is clamped to the adaptor, and a locking nut for engagement with a connector portion and retaining the expansion retainer on the hose assembly.

2. A hose assembly according to claim 1, in which the insertion portion comprises the first support portion which is arranged such that in use the first support portion of the adaptor and carried outer tube are introducible together in and clampable by a hose connector portion.

3. A hose assembly according to claim 1, in which the first support portion and the second support portion comprise a same support portion on which the outer tube and the inner component are both supported.

4. A hose assembly according to claim 1, in which the second support portion is arranged to receive and support a tube as the inner component.

5. A hose assembly according to claim 1, in which the adaptor comprises a fluid communication passage for allowing fluid communication between an interior of an inner tube mounted on the second support portion and an exterior of the inner tube.

6. A hose assembly according to claim 1, in which the second support portion projects longitudinally from the first support portion so that, in use, the second support portion extends further within the outer tube than the first support portion.

7. A hose assembly according to claim 1, in which the adaptor defines a receiving bore for receiving a spigot of a respective connector portion.

8. A hose assembly according to claim 7, in which a seal is provided for sealing between the spigot and the adaptor.

9. A hose assembly according to claim 1, in which the hose end adaptor is dimensioned and arranged so that when in position at an end of a hose assembly, that end of the hose assembly may be introduced into a garden hose connector portion.

10. A hose assembly according to claim 1, in which the clamping member is deformable into position to clamp the inner component onto the second support portion of the adaptor.

11. A hose assembly according to claim 1, in which the clamping member is threadingly engageable with the adaptor to clamp the inner component onto the second support portion of the adaptor.

12. A hose assembly according to claim 1, in which the clamping member has a supporting surface for supporting the inner component in the region of the adaptor.

13. A hose assembly according to claim 1, in which the clamping member has a flared supporting surface.

14. A hose assembly according to claim 1, further comprising an expansion retainer for controlling expansion of an inner tube mounted on the adaptor.

15. A hose assembly according to claim 1, which is a watering hose assembly or a watering hose arrangement.

16. A hose assembly according to claim 1 in which the insertion portion has an internal diameter and an external diameter dimensioned to correspond to one of 12.5 mm, 15 mm and 19 mm plastics material garden hose.

17. A hose arrangement comprising a hose assembly according to claim 1, and a first hose end component comprising a first connector portion mounted on a first end of the hose assembly and a second hose end component comprising a second connector portion mounted on a second end of the hose assembly.

18. A method of making the hose assembly according to claim 17, comprising the steps of:

providing the inner component within the length of outer tube so as to be nested therein;

locating a first end of the inner component on the second support portion of a first hose end adaptor;

locating a second end of the inner component on the second support portion of a second hose end adaptor;

locating a first end of the outer tube on the first support portion of the first hose end adaptor; and locating a second end of the outer tube on the first support portion of the second hose end adaptor;

clamping the first ends of the inner component and outer tube to the first hose end adaptor; and clamping the second ends of the inner component and outer tube to the second hose end adaptor.

19. A method of making the hose arrangement according to claim 17, comprising the steps of:

i) making the hose assembly by the steps of:

providing the inner component within the length of outer tube so as to be nested therein;

locating a first end of the inner component to the second support portion of a first hose end adaptor;

locating a second end of the inner component to the second support portion of a second hose end adaptor;

locating a first end of the outer tube on the first support portion of the first hose end adaptor;

locating a second end of the outer tube on the first support portion of the second hose end adaptor; and ii) locating and clamping the end of the hose assembly in the first connector portion of the first hose end component; and locating and clamping a second end of the hose assembly in the second connector portion of the second hose end component.

20. A hose arrangement comprising;

a hose assembly comprising a hose end adaptor arrangement located in an end of a length of outer tube at a first end of the hose assembly, and a hose end component comprising a connector portion mounted on the first end of the hose assembly, said connector portion comprising a spigot for introduction into the hose assembly and a clamping arrangement for clamping the hose assembly to the spigot;

wherein the hose end adaptor arrangement comprises;

an adaptor which holds an inner component of the hose assembly which is nested within the outer tube of a hose assembly, and which comprises:

a first support portion on which the outer tube is received, a second support portion on which the inner component is mounted, a clamping member clamping the inner component to the adaptor, and an insertion portion inserted into a part of the connector portion which is designated to receive the insertion portion of the adapter, wherein the inserted portion of the adapter has a bore which receives the spigot of the connector portion when the insertion portion is inserted into said part of the connector portion, with the clamping arrangement of the connector portion clamping the insertion portion of the adaptor to the spigot.

* * * * *